INVENTORS:
ARTHUR KESSLER
RUDOLF KREILING
PAUL SCHWETZ

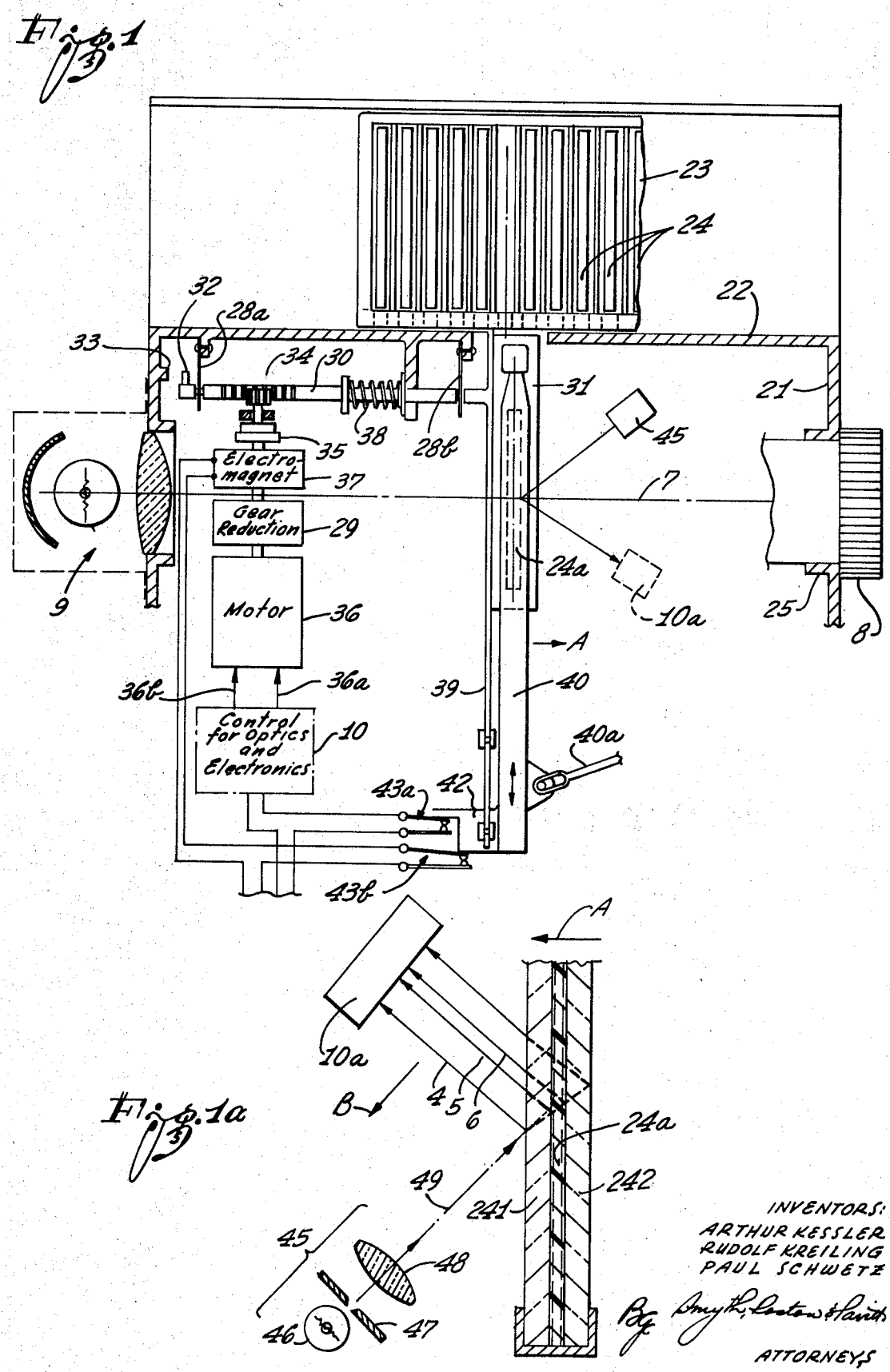

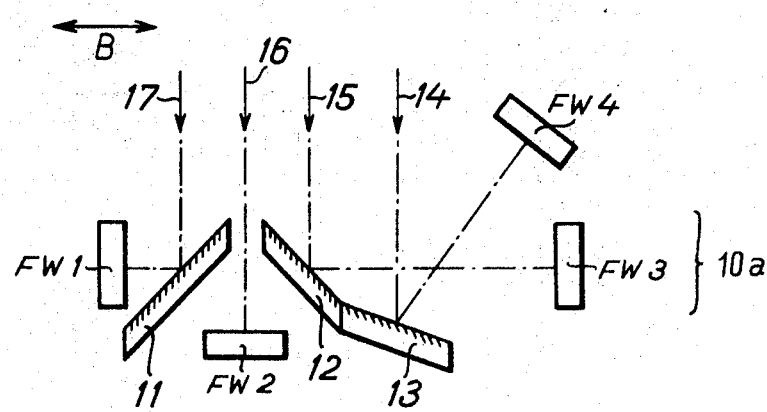
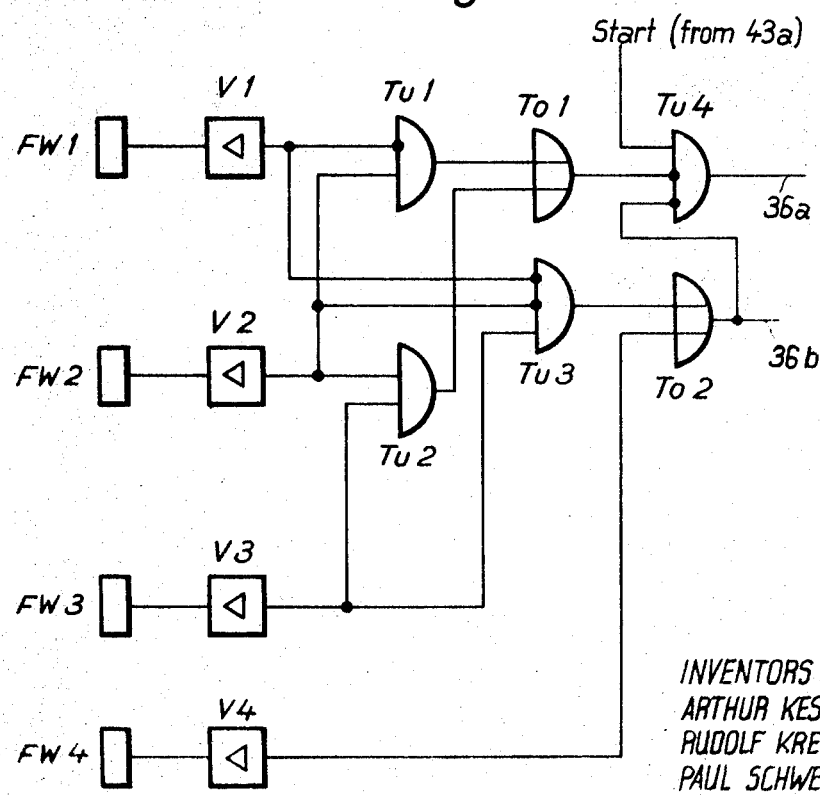

United States Patent Office 3,537,791
Patented Nov. 3, 1970

3,537,791
AUTOMATIC FOCUSING DEVICE FOR SLIDE PROJECTOR
Arthur Kessler, Grossaltenstadten, Rudolf Kreiling, Giessen, and Paul Schwetz, Asslar, Germany, assignors to Ernst Leitz GmbH, Wetzlar, Germany
Filed Sept. 28, 1967, Ser. No. 671,449
Claims priority, application Germany, Oct. 1, 1966, L 54,702
Int. Cl. G03f 3/10
U.S. Cl. 353—101                10 Claims

ABSTRACT OF THE DISCLOSURE

An automatic focusing device for slide projectors is disclosed in which three photo detectors respond to reflections of a control beam by the slide, to control the distance between objective and slide. In the correct distance a particular detector receives a reflection, to the exclusion of the others in case of a slide without glass mount, or in conjunction with another detector after a particular sequence of reflections have been received by the detectors in case of multiple reflections by a slide in a glass mount. The control operates in that either a particular, initial distance is established before the three detectors take over control, or a fourth detector supplements the three detector system to permit bidirectional control even in case of multiple reflections.

---

The present invention relates to improvements in a device for automatically focusing slide projectors considering particularly the possibility that in a sequence of slides to be projected, slides with and without glass cover mounts may appear at random. Automatic focusing devices for slide projectors are already known in the art. They use a photoelectric measuring device, including two photosensitive elements. A reversible motor is controlled from these photoelectric devices for controlling adjustment of the focusing elements. The photoelectric devices receive light which has been reflected by a single reflected surface of the slide. The illumination source for providing this light to be reflected as well as the photoelectric elements are oriented so that in case the slide is in proper position the reflected beam is separated in two equal components and the two photoelectric devices receive equal amounts of light. However, such a device operates properly only if the slide is not provided with a glass cover. In case of a glass mount multiple reflections are produced at the different surfaces, and the control device will tend to position the slide so that the front surface of the glass mount is in the position where the slide itself should be. The invention now is concerned with an automatic focusing device wherein the slide may not only have glass covers, but wherein slides, unmounted or mounted in glass mounts, can be used interchangeably, while the device automatically distinguishes between the two different cases. It is thus an object of the invention to provide automatic focusing at the desired degree of accuracy even though the number of reflections of the control beam differs if the slide is glass mounted or not.

From one point of view, the invention includes a photoelectric detection system with multiple detectors for cooperation with a control beam to be reflected by a slide when in the optical projection path. The detection system when responding to the essentially single component of the control beam as reflected by a slide without glass mount, provides immediate control for the change of distance between slide and projection objective, regardless whether initially that distance is too large or too small for accurate focusing.

The same detection system can be used to respond to a series of beams resulting from reflection of the control beam at the several parallel surfaces of a slide in a glass mount, and it can control the focusing, i.e., distance adjustment, provided the adjustment requires the distance to be changed in one direction, for example, to be decreased, so that the sequence of energization of the different elements in the detector system can be properly associated with different, particular reflecting surfaces of the slide. In order to provide oppositely directed control, either the detection system itself is supplemented by a detector providing, for example, control in that opposite direction as long as it receives any light; when not receiving light control is produced by the first mentioned detection system. Alternatively, after each slide exchange, the same particular distance between slide and projection system is initially established, which distance may, for example, be too large. Subsequently, control through the detection system takes over throughout the control operation there is never uncertainty as to what surface of the glass mounted slide produces a particular reflected component as received by the detector system in a predetermined sequence.

The principal detection system includes a photo detector oriented in relation to the control beam so that a reflecting surface in the desired position for sharp focusing reflects a component of the sharply focused, narrow angle control beam into that detector and controls the distance adjustment to stop. Additional detectors of the system operate by detecting either concurrently existence of multiple reflections from other surfaces (namely, of the glass plates constituting the glass mount) having other positions, or they detect passage of a single reflecting surface through such positions due to adjustment control, until light reaches only the first mentioned detector.

The invention can be practiced in two different embodiments. In the two embodiments, three light-sensitive elements or detectors constitute a principal detector system which suffice if there were only unmounted slides. In one embodiment there is provided additionally a device which establishes initially a particular, incorrect distance between slide holder in the projector and the objective thereof. Automatic focusing is obtained by changing that distance in one particular direction. For example, the distance between objective and slide holder may initially, i.e., after a new slide has been placed in the slide holder, always be larger than a required object distance for correct projection; the automatic focusing device then always operates towards reducing the distance down to the required correct value. The required change of distance between objective and slide holder involves only controlled, unidirectional motion for slides which are sandwiched in glass plates. For a slide without glass cover the focusing device should still operate for adjusting the distance in both directions in order to automatically compensate any defocusing of the image due to heating resulting in deflection of the slide. Such deflection does not occur when the slide is sandwiched in glass covers.

The control is now provided in such a manner that in case a single reflected light beam from the control beam energizes a first one or a second one or a third one of the three light-sensitive elements, a control motor for distance adjustment is respectively advanced, stopped or reversed; advancing means a change of distance out of the initial, intentionally faulty distance between slide holder and projector objective towards the accurate position. Reversion of the control motor, of course, means a change of that distance in the opposite direction. For the slide without glass cover, it is thus not necessary that initially a particular distance be established; the control works here bidirectional. However, the three operating conditions occur in that manner if and only if there is a single reflection, which, in turn, is indicative of a slide without glass covers.

If the slide is glass covered, multiple reflection occurs. In the initial position of a definite incorrect distance a light beam reaching again the first one of the three photocells to the exclusion of the others, controls the motor to advance; this is the same operation as in case of the uncovered slide, except that an outer glass cover surface of the slide provides the reflection. For the control to work properly it is required that before this control takes over, a definite incorrect distance be established, so that the light reaching the first detector is with certainty reflected by the outer glass cover surface. After control has taken over the same reflected light beam will soon reach the second one of the photosensitive elements. The distance adjustment should not stop now, because focusing to the outer glass cover surface is not desired. However, concurrently a second light beam reflected by an inner surface of the glass cover will reach the first one of the photocells. Therefore, the condition exists that if the first and the second one of the three photoelectric detectors are energized, the motor is to continue the advance. Finally, the situation will occur in which all three electric detectors receive light. The correct position has now been obtained, because, counting from the front of the slide, focusing should be provided so that the inwardly oriented surface of the front glass cover is in the focused plane, whereby "front" is related to the relative movement as between the slide and objective lens out of their initial position.

In summary, a first detector receives always light from the reflected control beam first after the distance between slide and objective lens has begun to change. A second detector, when receiving a reflected component from the control beam, causes the distance to be arrested, unless the first one still receives light; if it does, this will be a different component indicative of multiple reflection: glass mount. If light reception by the second detector has not stopped the distance adjustment, stopping will occur when both a third detector and the second detector receive light. In this case, the second detector receives light reflected by an inner glass cover surface against which the slide will abut. This then, is again the correct position.

In the second embodiment and in order to obtain full reversibility of control regardless of whether the slide is glass mounted or not, a fourth optical path including another photoelectric detector can be provided and oriented for control in that the motor will reverse as long as that particular detector receives light. The remaining three photoelectric detectors and the logic circuit processing their respective output signals operate as aforedescribed and still distinguish among slides with or without glass mounts. An automatic establishing of a particular distance prior to control is not necessary any more in this case.

For practicing the invention, it is thus important only to obtain a definite direction of sequencing of the different reflected portions of the control beam so that by implication an assignment as to the origin of the reflection can be obtained. It is hereby unimportant whether the control, in case of a three photo element device, operates with initially too large a distance between objective lens and slide, or with a too small one. Also, the light source for the control beam can be oriented so that it is in between the slide and the objective lens, or between slide and projector light source. It is essential only that the relative movement of the bundle of reflected light beams in relation to the photo detector arrangement permits positive association between the sequence of detected light beams and the origin of reflection, with positive distinction between single and multiple reflections. It should be mentioned further that in the preferred form of practicing the invention, the objective lens is stationary (except maybe for initial manual adjustment) and control beam production and detection devices are likewise stationary, while the slide holder is adjustable along the optical axis of the projection path. Alternatively, the slide holder can be stationary, while projection objective and control device are adjusted along that axis by the control.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIG. 1 illustrates somewhat schematically a view into a slide projector improved in accordance with the present invention;

FIG. 1a illustrates somewhat schematically the production of multpile reflections of a control beam on the several surfaces of a slide in a glass mount;

FIG. 3 illustrates a modified optical input system for complete bidirectional control; and FIG. 4 illustrates a circuit block diagram for processing the signals produced by the system shown in FIG. 3.

Figure 1B:
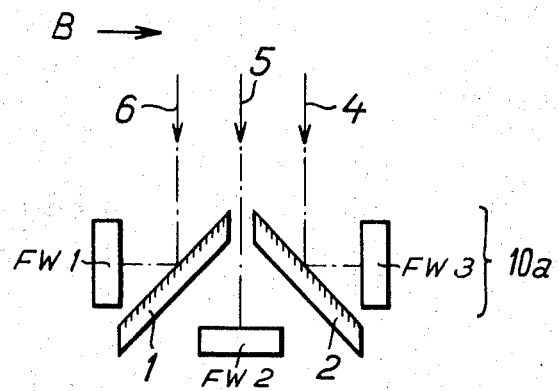
FIG. 1b illustrates somewhat schematically the optical input system for the detection of single or multiple reflections of the control beam.

Proceeding now to the detailed description of the drawings, in FIG. 1 thereof there is illustrated a portion of a projector improved in accordance with the preferred embodiment of the present invention. The projector has a structure frame and housing 21 having a guide chute 22 for slidingly receiving a slide tray 23. The tray 23 stores slides 24 is advanced stepwise in chute 22 in between sequential projections of two slides. For each advancing step, the tray is moved for a distance equal to the width of a single storage space or a width equal to the center to center distance between juxtaposed slides. The tray advancing mechanism is conventional and not illustrated.

A mounting portion 25 which is part of frame 21 receives the projection objective lens 8, which is manually adjustable along optical axis 7 to coarsely establish the correct and desired distance relationship between objective lens 8 and projection screen on one hand, and the objective lens and slide to be projected on the other hand. The correct and desired relationship is, of course, the projection of a sharp image of a slide onto the projection screen. Reference numeral 24a denotes a slide in projection position in the optical path along axis 7. A condenser-lamp system 9 provides the usual illumination along optical axis 7 and for the slide 24a as positioned in the optical path between the illuminating system 9 and the projector lens 8.

In the embodiment of the invention to be described first, there is a gear rack 30 mounted to frame 21 by means of two leaf springs 28a and 28b and parallel to the optical axis 7. Leaf springs 28a and 28b thus permit deflection of rack 30 over a limited range for variably positioning of the rack 30 in direction parallel to the optical axis 7. Rack 30 supports a slide holder 31 holding slide 24a during projection. This slide is injected into the holder by a slide changer 40. Slide changer 40 is under control of an actuator 40a. The slide changing operation is likewise conventional and not illustrated in detail. Suffice it to say that slide holder 31 has a rail 39 for the slide changer 40 for obtaining exchange of slides. Holder 31 supports and holds the slide 24a subsequent to exchange within the optical path of the projection system so that the slide is illuminated from the lamp-condenser system 9 for projection of an image of the slide onto the screen by the objective lens 8.

Due to connection of rack 30 to slide holder 31, slide 24a, is therefore, variably positioned along the optical axis. Position adjustment of the rack 30 can change the distance between slide 24a in holder 31 and the projector's objective lens 8. A stop member 32 on rack 30 cooperates with a stop 33 on frame 21 for limiting the maximum distance between slide holder 31 (and slide 24a) and projector lens system 8. Reference number 38 denotes a return spring which is tensioned in between a stationary part of the frame 21 and a portion of the track 30. Spring 38 normally urges the rack 30 so that the stop 32 abuts stop 33. When rack 30 has this particular terminal position, slide holder 31 has a position permitting slide exchange. However, the axial position of rack 30 is not necessarily critical with regard to the slide exchange process.

A pinion 34 meshes with rack 30. Pinion 34 is rotatably coupled to the driven part of a coupling or clutch 35. The driving part of clutch 35 can be connected to the driven part through an electromagnet 37. The driving part of clutch 37 is connected to the output of a speed reducing gear 29. A motor 36 is provided to drive pinion 34 through reducing gear 29, provided electromagnet 37 is energized to couple the driving part of clutch 35 to the driven part thereof. As long as magnet 37 is energized, the position of rack 30 is determined by the rotary assembly 36–29–35 and 34. Even when motor 36 is at rest, spring 38 is not strong enough to move rack 30 so that it could become the driver for pinion 34 as long as clutch 35 couples pinion 34 to gear 29. Therefore, magnet 37 is to be deenergized at times so that spring 38 can return rack 30 into the terminal position (abutment of cams 32–33).

The slide changer 40 is provided with a control cam 42 which controls a pair of switches 43a and 43b. The switches are closed only in the terminal position, i.e., after slide exchanger 40 has completed an exchange. This position is illustrated. The switch 43a is the start switch for motor 36, but the motor is controlled directly through a control circuit 10 to be explained in detail with reference to FIG. 2. The switch 43b governs the energizing circuit for the electromagnet 37. It follows, therefore, that magnet 37 is energized and the clutch 35 couples pinion 34 to motor 36 as soon as, as long as, and only if slide exchanger 40 has the terminal position usually obtained after it has or has attempted to place a slide into the projecting position in slide holder 31. This is the prerequisite for the automatic to take over.

If the slide exchanger was not capable of fetching a slide from the tray 23, motor 36 will stay at rest as control 10 is then actually not capable of starting the motor in spite of the control signal from switch 43a. Alternatively, there may be a second terminal position of rack 30 where stops 32 and 33 are rather far apart, and wherein a limit switch (not shown) stops motor 36 if it ran to move holder 31 in direction of arrow A, without being stopped through control of the automatic focusing device. On the other hand, as soon as slide exchanger 40 is moved towards tray 23, switches 43a and 43b open. The opening of switch 43a inhibits further movement of motor 36 in a direction tending to move rack 30 for an increasing distance between stops 32 and 33 while opening of switch 43b decouples pinion 34 from gear 29 and now spring 38 will return rack 30 to the terminal position.

The control system 10 includes an electrooptical part 45 and 10a illustrated schematically in FIG. 1 in their spatial relation to the slide 24a, and they will be explained with reference to FIGS. 1a and 1b. The portion 10a can functionally be regarded as included in device 10 which has an electrical circuit network to be explained with reference to FIG. 2. The optical part of the control system is defined as follows: A source 45 for a control beam 49 includes a light source 46 for which one can use either a separate lamp (as illustrated), or a suitable optical deflection system may use some of the laterally escaping light from the lamp-condenser arrangement 9.

Lamp 46 illuminates a diaphragm 47 with aperture, and a lens 48 provides the control beam 49 as a narrowly bundled light beam which focuses an image of the aperture in a particular plane. That plane extends transverse to optical axis 7 and is, so to speak, fixed in relation to frame 31. There has not yet been described an element which physically defines that plane, suffice it to say that is the desired object plane for the position of the slide to be projected. In view of the small size of the focused spot deriving from imaging the diaphragm aperture 47 by the lens 48, it is permitted to say that the aperture is sharply focused in the desired object plane for the principal projection system of the projector, even though there is an angle in between the optical path for control beam 49 and the object plane for the slide projection system.

If now a slide in a glass mount is placed in slide holder 31 and is positioned to intercept control beam 49, a plurality of reflections will be produced. The strongest reflection by far will come from the front, outer surface of a glass cover plate 241 for the slide. That reflected beam is denoted with reference numeral 4. A second, somewhat weaker, but still sufficiently strong reflection, occurs at the rear or inner surface of that front glass plate 241. This second reflected component of the control beam is denoted with reference numeral 5. Another reflection will occur at the front face of the slide facing the inner surface of glass plate 241 and within the space as defined by the two grass plates 241 and 243. However, that surface of the slide will most likely abut or be very close to the inner surface of plate 241 so that no real distinction among the reflections at these two surfaces is possible; beam 5 thus includes both of these reflections. The reflection of a portion of the control beam at the inner surface of the other glass plate 242 is denoted with reference number 6.

Of these three reflections, 4 and 5 are critical and they are needed for controlling the automatic focusing device in accordance with the present invention. Beam 6 is representative of additional reflections such as they occur at the rear surface of the slide and the two surfaces of the rear glass cover plate 242. These reflections are not only needed, but they provide disturbing influences; nevertheless they must be considered and cannot be ignored.

Figure 2:
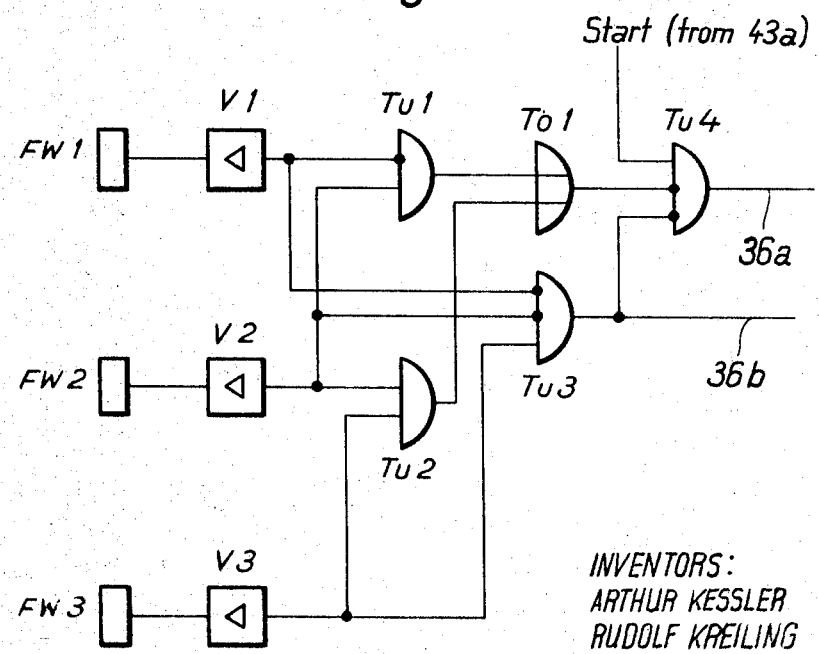
FIG. 2 illustrates a circuit-block diagram for processing the signals produced by the input system shown in FIG. 1b.

The several reflected portions of the control beam will be received by the unit 10a which is shown in detail in FIG. 1b and to some extent also in FIG. 2. Consider now that the slide moves in direction of arrow A, due to motion of slide holder 31 (FIG. 1) as driven by the rack 30. For such motion, the several beams 4, 5 and 6 will move in direction of arrow B. That motion is utilized for purposes of control.

Proceeding now to FIG. 1b there is illustrated a photoresistor FW2 which receives at any instant one of the three reflected measuring beams, 4, 5 or 6 through a diaphragm-type aperture formed by edges of two mirrors 1 and 2. The figure shows particularly beam 5 as the one which can pass through the aperture as defined by the mirrors 1 and 2. Upon comparing FIG. 1a and FIG. 1b one can readily see that this is possible only if the inner surface of front glass plate 241 has a particular position in relation to the stationary arrangement 45–1–2–FW2. Conversely, one can say that the orientation of mirrors 1 and 2 as defining the aperture for detector FW2 as receptor in relation to beam 49 is such that they define a potential reflection plane, and any reflecting surface in that plane will reflect a portion of beam 49 towards detector FW2. That plane is now the desired object plane for the projection. Thus, if beam 5 is received by detector FW2, the inner surface of the front glass plate 241 is in the desired object plane, and the closely positioned slide within the glass mount is then, for all practical purposes, in the object plane for the projecting objective 8. Beam 4 resulting from reflection of the outer surface of front plate 241 is reflected by mirror 2 to be received by a detector such as photoresistor FW3. Beam 6 and others are reflected by mirror 1 and received by detector FW1. The reflected sense beams 4, 5 and 6 are illustrated with their axial rays only.

The arrow B in FIG. 1b illustrates likewise the travel path of the beams 4, 5 and 6 if the distance between the slide positioning device 30 and the projection objective 8 diminishes, which occurs when motor 36 drives rack 30 out of abutment position as between the stops 32–33, which is a motion to the right in FIG. 1 or in direction of arrow A in FIG. 1a. It is further of importance that with a slide in holder 31, the front surface of the front glass cover plate of the slide has a position when rack 30 is in the terminal position, that ray 4 may, at most, reach detector FW1 by reflection at mirror 1, but definitely not detectors FW2 and FW3.

Turning now to the description of FIG. 2, there is shown that the photoresistor FW1 is connected through an amplifier V1 to the inhibitor input of a two input AND gate TU1. The output of the amplifier V1 is also connected to one inhibitor input of a three input terminal AND gate TU3. The signal polarity has been chosen that upon receiving of radiation by photoresistor FW1, the two gates TU1 and TU3 are blocked.

The output of the photoresistor FW2 is passed to an amplifier V2 and the output thereof is utilized in a threefold manner. At first the output of amplifier V2 is passed to the second, noninverting input of AND gate TU1 to provide a gating open signal for that AND gate. Secondly, the output of amplifier V2 is passed to a second inhibitor input of AND gate TU3 and thirdly, the output of amplifier V2 is passed to a direct input of a two input AND gate TU2. Upon receipt of radiation by the photoresistor FW2, gates TU1 and TU2 are opened, but gate TU3 is also blocked.

Finally, the output of detector or photoresistor FW3 is amplified by amplifier V3, the output of which being fed as direct inputs to gates TU2 and TU3.

As one can see, the output of AND gates TU1 and TU2 are combined in an OR gate TO1. Thus, an output signal is provided by OR gate TO1 if the photoresistor FW2 receives a radiation signal while concurrently photoresistor FW1 does not receive a radiation signal, as only that can open gate TU1. An output pulse can thus pass through OR gate TO1 when a beam passes through the gap between mirrors 1 and 2, while no light is reflected by mirror 1. Alternatively, an output signal can be derived from the OR gate TO1 as a result of a radiation pulse received by photoresistor FW2, if gate TU2 is open by the output of amplifier V3 which receives an input signal from the photoresistor FW3 provided the latter receives radiation. This alternative output of TO1 is independent from any radiation reaching detector FW1.

The output of OR gate TO1 is passed to one inhibitor input of a three input AND gate TU4 which output signal thus closes AND gate TU4. AND gate TU3 is blocked upon receipt of any light signal by photoresistor FW1 and/or by photoresistor FW2. If neither resistor (FW1 or FW2) receives light, but resistor FW3 does, then gate TU3 passes an inhibiting input to gate TU4. It follows then that gates TU4 and TU3 are never concurrently enabled, though both may be disabled, which occurs when detector FW2 receives light while neither detector FW1 nor detector FW3 receive light, or when both detectors FW2 and FW3 receive light independent from the state of detector FW1. Gate TU4 is enabled as long as detector FW2 does not receive light, or if both detectors FW1 and FW2 receive light. Gate TU3 is enabled and active as long as detector FW3 receives light, while neither of the other two detectors receive light.

The output of AND gate TU4 is passed to input channel 36a for motor 36 causing the motor to run in a direction tending to diminish the distance between the slide in holder 31 and projection objective 8; moreover, it is this a controlled motion in direction of arrow A. Of course, motor 36 can run only if a third input signal for the AND gate TU4 is true; it is this the start signal derived from switch 43a when closed. Hence the start signal is permitted to pass through AND gate TU4 provided neither of the two inhibitor inputs are received by AND gate TU3. The output of AND gate TU3, if true, i.e., particularly an output signal of amplifier V3 when concurring with the absence of either of the two inhibiting signals for the AND gate TU3 is permitted to pass into channel 36b, causing motor 36 to run in the reverse. Motor 36 stops if neither gate TU3 and TU4 provides a true signal. This occurs if no start signal is in existence, i.e., during slide exchange; or if detector FW2 along or together with detector FW3 receive light.

The device operates as follows: If the rack 30 is in the terminal position where stops 32 and 33 abut, then the distance between the inserted slide and the objective lens is definitely larger than the required distance for sharp projction. After completion of slide exchange, switch 43a produces a start signal so that there is an output signal from switch 43a to AND gate TU4 as soon as a slide is placed into the projection path by the slide changing mechanism. As stated above, an advance control signal for motor 36 can be provided only if the AND gate TU4 does not receive either of the two inhibiting signals. This means that neither one of the AND gates, TU1, TU2 and TU3 must provide an output. This requires that neither the photoresistor FW2 nor the photoresistor FW3 receives light. The photoresistor FW1 may receive light but this is insufficient to produce any signal in either one of the motor control channels. These conditions are satisfied when the initial condition is that the distance between slide and objective is too large. In this case beam 4 will be in relation to the mirrors 1 and 2 to the left of FIG. 1b, possibly reaching detector FW1, but none of the others. Hence, motor 36 will receive an advance control signal.

As motor 36 runs, the distance between slide and objective is shortened and the three beams 4, 5 and 6 travel in the direction of the arrow B of FIG. 1. The first one of the three reflected sensing beams is always a beam resulting from reflection of the front surface of the slide at the chosen orientation. It is important now, that this first beam could be the beam 4 resulting from reflection of the front surface of the front glass plate of a slide in a glass mount. That beam could, however, be the single reflection beam of the slide itself if it does not have glass covers. It is now up to the circuit to detect the distinction.

First, the situation of a slide having no glass cover shall be discussed. In this case the single reflected component of the control beam energizes, at first photoresistor FW2 and as motor 36 continues, that single component will soon pass through the gap between mirrors 1 and 2 to reach photoresistor FW2 and shortly thereafter light does not reach any more detector FW1. FW3 still does not receive light at that time. Looking at the circuit, AND gate TU1 does not receive an inhibiting input but receives the direct input signal from the amplifier V2; therefore, gate TU1 supplies an output signal through OR gate TO1 and provides an inhibiting input to AND gate TU4 which, accordingly, becomes blocked. As detector FW2 receives light, gate TU3 remains blocked, and the motor reverse control channel 36b will not receive an energizing signal. Thus, motor 36 is and remains stopped. This then is the focusing position for the side verifying the assumption that the plane of reflection for control beam 49 when the reflected component reaches detector FW2 is the object plant. As a slide without glass mount has a single reflecting surface, that surface is now in the correct object plane for projection.

If for reasons of heat the unprotected slide bends, then the single reflected or control beam will not pass any more through the aperture as defined by the mirrors 1 and 2; but the reflection will reach either photoresistor FW1 or photoresistor FW3, depending on the direction of bending. In the first case, i.e., if the photoresistor FW1 receives light again, inhibition for gate TU4 is removed, even if detector FW2 still receives some light. If bending is very strong, detector FW2 may even receive no light any more. Decisive is that photoresistor FW1 does receive some light causing gate TU1 to block and, accordingly, motor 36 is controlled for further diminishing the distance between slide holder 31 and projection objective 8 until again no light reaches any more photoresistor FW1 so that again all reflected light of the control beam is received by the photoresistor FW2, whereupon the motor will stop again.

Should the slide bend in the opposite direction or should, for any reason, the motor "overshoot," then the photoresistor FW3 will receive at least some light; while neither photoresistor FW1 nor photoresistor FW2 receives light. Now the two inhibiting inputs are removed from AND gate TU3, and the "light" signal from photoresistor FW3 is permitted to pass through the open gate TU3 into motor reverse channel 36b. Additionally, an inhibitor input is provided to the AND gate TU4 to positively block forward advance control. The motor will now reverse until detector FW3 does not receive light any more. Stable conditions are again obtained if photoresistor FW2 is the only one to receive light.

Thus, one can see that in case the slide "pops" in either of the two directions along the optical axis 7, the focusing device control tracks the slide and places it back into the desired object plane for the imaging process as provided by the objective lens 8.

Now we have to consider the case that the slide is in a glass mount, whereby it is of particular importance that the circuit does not require to be changed; the circuit distinguishes itself between slides with or without glass mount and still places it into the correct position for sharp projection. As stated above, there will occur at least the three reflections 4, 5 and 6. If the slide does not abut directly the inner surface of the front glass plate 241, there will be an additional reflected beam, in between beams 5 and 6, but still rather close to beam 5 so that this distinction does not have to be made. The sequence of operation is now as follows:

The slide is again being placed into the projection path at too large a distance from the object because spring 38 pushed rack 30 and slide holder 31 into the terminal position during slide exchange. Thus, at first neither or, at most, a reflection on the outer surface of the front glass plate 241, i.e., beam 4 reaches photoresistor FW1, this has no immediate effect on the control circuit, as motor 36 will be controlled by channel 36a for advancing as soon as switch 43a closes and as long as detectors FW2 and FW3 do not receive light. The distance between slide 24a and projection objective 8 will thus diminish and the slide moves in direction A. Pursuant to the motion imparted upon the device by the motor, the first beam 4 will soon pass through the gap between mirrors 1 and 2 to reach detector FW2. For the slide without glass mount, this was the stop position of the control, but for the slide in glass mount, a second reflected beam comes up, which is beam 5. Thus, detector FW1 continues to be reaching photoresistor FW1. Gates TU1 remains blocked as long as both photoresistors FW1 and FW2 receive light (while FW3 does not). Accordingly, OR gate TO1 receives no input signal and does not provide any inhibiting input for the middle input terminal of gate TU4. As gate TU3 still does not produce any output, motor 36 continues to advance the slide holder in forward direction, arrow A.

Soon detector FW3 will receive light, namely, from beam 4 while the middle beam 5 reaches photoresistor FW2 through the gap between mirrors 1 and 2. Now, all resistors FW1, FW2 and FW3 receive light; this is the illustrated position of FIG. 1b. Beam 6 may be rather weak so that the response threshold of the channel FW1-VI is not reached. However, it is of particular importance only that now the two resistors FW2 and FW3 receive light to produce an output signal in AND gate TU2. The output of gate TU2 blocks AND gate TU4 through OR gate TO1 and the motor stops again as beam 5 energizes detector FW2. It should be mentioned that since reception of light by all three (or at least by two particular) detectors defines the motor stop state, one can position the detectors to receive some stray light from the projector lamp 9 in case there is no slide in the holder 31 as there can be no reflection. The framing of the slide, glass mounted or not, inhibits such stray light and places the detectors under exclusive control by the reflections of the control beam.

The beam 5, as stated, was produced by a reflection at the rear surface of the front glass plate which is thus in focus. Since the slide usually abuts that surface, it is itself placed in sharp focus. Should there be a framing mask positioned in between the front glass plate and the slide, then, of course, there is a certain distance between the slide and the inwardly directed surface plane of the front glass plate 241. However, it was found that these masks are usually so thin that the depth of field of the projection objective is not exceeded and a sharp projection is still obtained. As bending of the slide in the glass mount is inhibited by the mount, no necessity for providing control opposite to arrow A arises.

The device shown in FIG. 2, per se, however, has the disadvantage that a sharp focusing of a slide in a glass mount is obtained only if initially the distance between slide and projection in projecting objective is too large so that control is always unidirectional in direction of arrow A. The slide without glass cover could have any initial position for automatic focusing, but not the one in glass mount. Of course, the device could be constructed so that the initial distance between slide and focusing lens is always too small. Essential for the circuit of FIG. 2 is that there is a definite sequence of multiple reflection rays as they reach the several detectors during adjustment, so that the "leading" beam can always be traced as reflection at a particular outer surface of the slide cover or at the slide itself if not provided with a cover.

The device of FIG. 2 operates in that for each new projection there is a new adjusting operation. In order to reduce wear and tear it is desirable to limit the automatic adjusting as carried out by the focusing device to the exceptional case rather than to make it a rule. Moreover, slide changers can be constructed so that throughout the control range, for any of the axial positions of slide holder 31, an exchange is possible. The device shown in FIG. 3 and FIG. 4 supplements the device shown in FIGS. 1 and 2 in order to permit sharp focusing of slides with or without cover regardless whether initially they are too close to or too far from the projecting objective. In this case, spring 38 can be eliminated.

FIG. 3 shows mirrors 11 and 12 which are the same as mirrors 1 and 2 in FIG. 1b. In addition, there is now provided another mirror, 13 which directs a light beam to a fourth photoresistor FW4. The figure shows four reflected beams 14, 15, 16 and 17 which, however, are used here to denote sequences rather than reflections from particular surfaces. For a glass mounted slide, there will still be multiple reflected beams including the one considered before. For a slide mounted without glass plate covers, there still will be only a single reflected control beam component.

The circuit shown in FIG. 4 is also similar to the circuit shown in FIG. 2 except that the motor control channel 36b is not directly the output of AND gate TU3 but is coupled thereto through an OR gate TO2 receiving as alternative input the output of an amplifier V4. Amplifier V4 is controlled by the fourth photoresistor FW4. The connection is made so that forward control gate TU4 is blocked, either when gate TU3 is enabled (as before) or as long as resistor FW4 receives any light; while concurrently motor 36 is controlled to run in a reverse direction.

The device shown in FIGS. 3 and 4 operates in the same way as the one shown in FIGS. 1b and 2 if the slide has initially a distance from the focusing objective larger than the desired object distance. In this case, photoresistor FW4 never receives light, and the channel FW4-V4 does not introduce any controlling influence into the circuit: The motor comes to a stop when the slide has obtained the desired position and before any light can reach resistor FW4.

The photoresistor FW4 will be energized if initially the distance between slide and projection objective 8 is too small. The light then received by the photoresistor FW4 may result from reflection on any of the slide's surfaces. Taking up first again the case if a slide without glass cover, then there is a single reflected measuring beam. That beam will reach the photoresistor FW4, for example, if the new slide, after a slide change, has obtained a position which the previous slide had, and if the previous slide did bend rather severely in back direction, so that the position of the holder 31 is relatively close, too close for the new slide which did not (yet) bend. The light reaching photoresistor FW4 produces a signal which is passed through OR gate TO2 to the one inhibiting input of the AND gate TU4 as well as into the motor reverse control channel 36b. Thereupon the motor will begin to run in the reverse direction, i.e., it will increase the distance between slide and objective 8.

As motor 36 runs in the reverse, the reflected, single measuring beam will soon leave the range of photoresistor FW4 but will reach the resistor FW3. The resistors FW1 and FW2 still do not receive any light, so that gate TU3 is enabled to serve as an alternative input for the OR gate TO2. Thus, the previous operative state in which the forward or advance control channel 36a for the motor is blocked and in which the motor is controlled for running in the reverse direction is maintained. One can see that the motor will be stopped only after the light beam has also left the detection range of photoresistor FW3 and reaches exclusively photoresistor FW2 through the gap, as defined by the two mirrors 11 and 12.

Taking now the case of a slide in a glass mount, then again any light which may result from reflection at any of the involved surfaces, when reaching photoresistor FW4, causes the motor to run in the reverse direction. One can see that this is entirely independent from the fact that any of the other resistors FW1, FW2 and FW3 may also receive light. As long as resistor FW4 receives light the advance control channel is blocked because AND gate TU4 receives an inhibiting input from gate TO2 and the reverse control channel 36b receives the output signal through OR gate TO2. The reverse control lasts until photoresistor FW4 receives no light and the beam reflected by the outer surface of the front glass plate reaches photoresistor FW3. The gap defined by mirrors 11 and 12 ensures that still but one reflected component of the control beam can reach the photoresistor FW2. Mirror 12 itself is selected to have a size which depends upon the average thickness of a glass plate in a slide mount as commonly used. Light reflected at the outer surface of the front cover plate cannot reach photoresistor FW2 at that point. On the other hand the gap between mirrors 11 and 12 is selected so that reflections on any of the other surfaces, for example, of the rear glass plate should likewise not reach photoresistor FW2. In this case it is ensured that upon energization of photoresistor FW3 by a light beam with concurrent absence of any light reaching the photoresistor FW4, light concurrently reaching the resistor FW2 does, in fact, result from reflection at the rear surface of the front glass plate. Therefore, sharp positioning is unambiguously obtained.

The invention is not limited to the embodiments described above but all changes and modifications thereof not constituting departures from the spirit and scope of the invention are intended to be covered by the following claims.

What is claimed is:

1. Device for automatically focusing a slide projector, the slide projector including a projection objective and a slide illuminating source defining an optical path, the projector including a slide holder in the optical path and means for adjusting the distance between slide holder and objective, the device including means for directing a narrow control beam toward the slide holder and from outside of the optical path, to be reflected at an angle by a slide when in the slide holder and towards an evaluating device controlling the distance adjusting means, a slide in the slide holder and having transparent covers for mounting, offering multiple reflecting surfaces to the beam resulting in multiple, distinct reflected components, a slide not having transparent covers offering essentially only one surface for reflection, the improvement comprising:

a plurality of detectors positioned to sequentially receive a component of the control beam when reflected at a particular surface in and perpendicular to the optical path, and as sequentially passing through a plurality of different parallel positions, a first detector of the plurality receiving the reflected component to the exclusion of the others of the plurality when the reflected surface has one particular position of the plurality, the other detectors of the plurality having position for receiving concurrently different components of the control beam if a plurality of reflected surfaces respectively have the positions of this plurality;

first means under control of the detectors and responsive to a first particular plurality of combinations of reception and nonreception of light by the detectors of the plurality, for controlling the distance adjusting means to maintain the distance then existing, each combination including reception of light by the first detector, one combination constituted by absence of reception of light by the additional detectors concurring with reception of light by the first detector;

second means under control of the detectors and responsive to a second particular plurality of combinations of reception and nonreception of light by the detectors of the plurality for controlling the distance adjusting means to alter said distance in one direction; and third means under control of the detectors and responsive to at least one third combination not included in the first and second plurality, of reception and nonreception of light by the detectors and connected for controlling the adjusting means to alter said distance in direction opposite to the one direction.

2. Device as set forth in claim 1, the means for directing a control beam and the detectors being positioned on that side of the slide holder and of the slide in the slide holder facing the objective.

3. Device as set forth in claim 1, including means operable in response to an exchange of slides in the slide holder for obtaining a particular distance between slide holder and objective;

the second means including control means to operate the adjusting means for changing the distance from the particular distance in a particular direction so that a reflected component is detected by a second detector of the plurality subsequent to detection by the first detector of plurality.

4. Device as set forth in claim 3, the particular distance being larger than the required distance, wherein the slide is in the desired object plane.

5. Device for automatically focusing a slide projector, the slide projector including a projection objective and a slide illumination source defining an optical path, the projector including a slide holder in the optical path and means for adjusting the distance between slide holder and objective, the device including means for directing a narrow control beam towards the slide holder, and from outside of the optical path, to be reflected at an angle by a slide when in the slide holder and towards an evaluating device controlling the distance adjusting means, a slide in the slide holder and having transparent cover mounts offering multiple reflecting surfaces to the beam, resulting in multiple, distinct reflected components, a slide not having transparent covers offering essentially only one surface for reflection, the improvement comprising:

a plurality of detectors positioned and oriented to respectively receive components of the control beam if reflected by differently positioned, parallel surfaces in and oriented transverse to said optical path, and including a first detector receiving a component of the control beam if reflected by a surface in an object plane for the projection objective, at least two others of the detectors being particularly oriented to receive light concurrently with the first detector only, if at least two additional reflecting surfaces pertaining to a slide carrier are in said optical path, while a slide surface is in the object plane;

first means under control of the detectors to provide distance variation of the adjusting means; and second means connected to the detectors and to the adjusting means to stop the adjusting means at a particular distance and including means (a) responsive if only said first detector receives a reflected component of the control beam to the exclusion of the other detectors of the plurality, and means (b) responsive if said first and said other two detectors each receive respectively reflected particular components, the means (a) and the means (b) when responding causing the adjusting means to stop.

6. Device for automatically focusing a slide projector, the slide projector including a projection objective and a slide illuminating source defining an optical path, the projector including a slide holder in the optical path and means for adjusting the distance between slide holder and objective, the device including means for directing a control beam toward the slide holder, and from outside of the optical path, to be reflected at an angle by a slide when in the slide holder and towards an evaluating device controlling the distance adjusting means, a slide in the slide holder and having transparent cover mounts offering multiple reflecting surfaces to the beam, a slide not having transparent covers offering essentially only one surface for reflection, the improvement comprising:

a plurality of at least three detectors oriented to receive reflections of the control beam from differently oriented, parallel surfaces in the optical path, a first one of three detectors receiving a reflection of the control beam when a slide has a surface in a particular, object plane of the projection objective;

first means connected to a second one of the detectors and further connected for controlling the adjusting means for enlarging the distance upon reception of a reflected component of the control beam by the second one of the detectors;

second means connected to a third one of the detectors and further connected for controlling the adjusting means for shortening the distance upon reception of a reflected component of the control beam by the third one of the detectors; and third means connected to the first detector and further connected for disabling the first and second means upon reception of light by the first detector.

7. A device as set forth in claim 6, the third means being additionally under control of the detectors for providing stopping of the adjusting means when at least two of the three detectors receive reflected components and providing distance change in one particular direction by the adjusting means when one of the latter two detectors does not receive light and concurrently at least one of the others of the three detectors receives reflected components.

8. A device as set forth in claim 7, including a fourth detector positioned to receive light only when a particular reflecting surface of the slide is not in the object plane, the fourth detector connected to control the adjusting means to control change of said distance in direction opposite to the one particular direction.

9. Device for automatically focusing a slide projector, the slide projector including a projection objective and a slide illuminating source defining an optical path, the projector including a slide holder in the optical path and means for adjusting the distance between slide holder and objective, the device including means for directing a control beam towards the slide holder, and from outside of the optical path, to be reflected at an angle by a slide when in the slide holder and towards an evaluating device controlling the distance adjusting means, a slide in the slide holder and having transparent cover mounts offering multiple reflecting surfaces to the beam, a slide not having transparent covers offering essentially only one surface for reflection, the improvement comprising:

a first detector, positioned and oriented to receive a component of the control beam, if reflected by a reflecting surface having a particular position coplanar with the desired object plane for the projection objective;

a second detector positioned and oriented to receive the component of the control beam prior to reception by the first detector if the reflecting surface producing the reflected component moves in relation to the first and second detectors and in a particular direction towards the desired object plane;

first means including the second detector and being responsive to presence and absence of multiple reflections of the control beam by more than one reflecting surface in the optical path pertaining to a slide in the slide holder with transparent cover plates, to provide control signals representative thereof; and second means connected to the first detector and to the first means, for operating the adjusting means, to obtain a distance where a particular reflecting surface is in said object plane and stopping the adjusting means when a single reflected component from a slide in the slide holder without transparent covers or a particular reflected component of a plurality of reflections of the control beam is received by the first detector.

10. Device as set forth in claim 9, the first means including at least one third detector positioned so that a reflected component of the control beam is detected by the third detector subsequent to detection by the first detector, pursuant to change of the distance by the adjusting means in the particular direction, and further positioned to receive light reflected by an outer surface of the slide when the first detector receives light reflected from the surface of the slide as then positioned in said object plane.

References Cited

UNITED STATES PATENTS

| 3,249,007 | 5/1966 | Stauffer | 353—101 |
| 3,377,917 | 4/1968 | Mulch | 353—101 |

FOREIGN PATENTS

| 1,127,617 | 4/1962 | Germany. | |

HARRY N. HAROIAN, Primary Examiner